2,950,304

PREPARATION OF ORGANOMERCURY COMPOUNDS

James M. Riddle, Baton Rouge, La., assignor to Ethyl Corporation, New York, N.Y., a corporation of Delaware No Drawing. Filed May 1, 1959, Ser. No. 810,237

5 Claims. (Cl. 260—431)

The present invention is concerned with a process for the production of organomercury compounds, particularly dialkylmercury compounds.

There are numerous methods reported in the literature for the preparation of organomercury compounds. Without attempting to mention all such processes, the following are typical: mercury has been reacted with alkyl halides to form alkylmercury halides; sodium amalgam has been reacted with alkyl halides to form dialkylmercury compounds; and certain mercury halides have been reacted with certain organometallic compounds, e.g. the Grignard reagent, to form the dialkylmercury compounds. All of the presently known procedures are primarily of academic interest and suffer particular disadvantages. So far as now known, a simple and convenient method for the preparation of dialkylmercury compounds, readily adaptable to commercial operation, has not been available.

The alkyl mercury compounds are of considerable utility. For example, they are useful as intermediates for forming other organometallic compounds, a typical reaction being that of diethylmercury with sodium metal to form ethylsodium. Another use for the mercury compounds, and derivatives thereof, is in agricultural chemical applications. Still other uses are known and a more practical method for their preparation is desirable to further amplify the utility of these compounds.

Accordingly, an object of this invention is to provide a new and novel process for the production of organomercury compounds. A further object is to provide a process whereby greater and more economical yields of organomercury compounds are obtained. A particular object is to provide a new and novel process for the manufacture of dialkylmercury compounds. These and other objects will be apparent as the discussion proceeds.

The above and other objects are accomplished by reacting a trialkyl- or trialkenylborane with a mercury salt of an organic acid in an aqueous medium. The mercury salts of lower alkanoic acids, especially mercuric acetate, and the lower trialkylboranes, especially triethylborane, are preferred reactants. Particular advantage is achieved when the reaction is conducted at a temperature between about 20 to 100° C. and sufficient water is present to provide a fluid reaction medium, especially one in which all of the reactants are dissolved. Still further advantage toward an improved reaction is obtained when an alkali metal hydroxide, particularly sodium hydroxide, is incorporated in the reaction mixture in at least a minor amount. Thus, a particularly preferred embodiment comprises the reaction of a lower trialkylborane with a mercury salt of an organic acid at a temperature between about 20 to 100° C. in the presence of a sufficient amount of water to provide a fluid reaction system and in the further presence of at least a minor amount of an alkali metal hydroxide. A specific embodiment of this invention comprises the reaction of triethylborane with mercuric acetate at 20 to 100° C. in the presence of water and in the further presence of a minor amount of sodium hydroxide.

The present invention is of particular advantage over the prior art methods for producing organomercury compounds in that high yields are obtained employing less stringent conditions. For example, the process provides high yields of the desired organomercury product employing materials which are not sensitive to water and are less hazardous to handle. Another advantage is that a completely liquid reaction system wherein all reactants are miscible is possible. A still further advantage is that the product is readily recoverable from the reaction system since, in most cases, it is more dense and immiscible dropping to the bottom of the reaction mixture. These and other advantages will be evident as the discussion proceeds.

In general, any mercury salt of an organic acid is applicable in the process. While organic acids are generally considered as having carboxylic groupings, it is also recognized that certain organic compounds not having such acid groupings but having strongly acidic hydrogen are organic acids, for example, alcohols and phenols. Thus, the mercury salts of organic acids employable in the process can be characterized as mercury compounds wherein mercury is attached to at least one carbon-containing organic radical through an intermediate atom of oxygen or sulfur. For practical reasons, the hydrocarbon portions of such acids will generally contain not more than about 25 carbon atoms, even though higher molecular weight materials can be employed. Illustrative examples of the mercury salts of organic acids include mercuric and mercurous formate, mercuric acetate, mercuric propanoate, mercuric butanoate, mercuric octanoate, mercurous myristate, mercuric octadecanoate, mercuric linoleoate, mercuric octadecenoate, mercuric butyrate, mercuric ethylate, mercuric phenolate, mercuric benzoate, mercuric thiophenolate, mercuric naphthenate, mercuric thioacetate, mercuric isobutyrate, mercuric propiolate, and the like. It is to be understood that the hydrocarbon portions of such acid salts can be further substituted to result in branched chain isomers or substituted with functional groups such as the halogens, keto, and the like groups, provided such are essentially inert in the reaction. The mercury salts, particularly the mercuric salts, of the lower alkanoic acids, especially those having up to about 8 carbon atoms in the hydrocarbon portions, are preferred because of their greater availability, economy, solubility in the reaction system, and higher yields obtained. Mercuric acetate comprises an especially preferred mercury salt of an organic acid.

The organoborane compounds employed in the process are the trialkyl- or trialkenylboranes. In geeral, such compounds will contain up to and including about 18 carbon atoms in each hydrocarbon portion. Illustrative examples of the alkyl- and alkenylboranes are trimethylborane, triethylborane, tripropylborane, trihexylborane, trioctylborane, tridecylborane, tridodecylborane, trioctadecylborane, trivinylborane, tri-1-propenylborane, tri-2-butenylborane, tri-1-hexenylborane, tri-1-octenylborane, tri-1-octadecenylborane, tri-2,4-octadecadienylborane and the like. The hydrocarbon portions of such compounds can be branched chain and further substituted with functional groups which are essentially inert in the reaction, such as the halogens, carbonyl and the like. The trialkyl- and trialkenylboranes of the lower alkyl and alkenyl radicals, that is, having up to and including about 8 carbon atoms in each of such groups, are preferred because of their greater availability and reactivity in the process. The trialkylboranes having up to and including about 8 carbon atoms in each alkyl group are more especially preferred, particularly triethylborane, because of their easier handling and greater availability.

The proportions of the reactants can be varied over a considerable range to still result in the desired organomercury compound. It is preferable, however, to employ at least the stoichiometric amount of the alkyl- or alkenylborane compound. Advantage is achieved in higher yields and faster reaction rates when a molar excess between about 5 to 15 percent of the alkyl- or alkenylborane is employed. In determining the stoichiometry, one can base it upon the consumption of one or all of the alkyl or alkenyl groups in the trialkyl- and trialkenylboranes. Since faster reaction is obtained of the first alkyl or alkenyl group of the organoborane compound, a particular embodiment of the invention comprises employing the above stoichiometric portions based upon reaction of only one alkyl group per molecule of the alkyl- or alkenylborane. The water employed in the system is usually provided in amount to result in a fluid reaction mixture. It is also desirable to employ at least 3 moles of water per mole of the trialkyl- or trialkenylborane. In a preferred embodiment, between about 5 to 200 moles of water per mole of the alkyl- or alkenylborane is employed.

The process is subject to relatively simple manipulative operations. In general, the requisite amounts of organoborane compound and water are added to a reactor and then the mercury organic acid salt is added thereto. The reverse mode of addition is equally applicable although higher yields are obtained when adding the mercury organo acid salt to the organoborane. The mixture is then agitated to facilitate contact of the reactants. During the addition and reaction, an inert atmosphere, such as nitrogen, argon, or krypton, is preferably employed because of the flamability of the organoborane compound. The mixture is reacted at the desired temperature and then, or during the course of the reaction, the product can be withdrawn in essentially pure form from the bottom of the reactor, in those instances wherein the product is of appropriate specific gravity, or, alternatively, the product is readily distillable from the reaction mixture in pure form. It is to be understood that other variations in the process can be made without departing from the purposes of the present invention.

The process will be more completely understood from a consideration of the following examples wherein all parts are by weight unless otherwise specified.

*Example I*

Into a reactor equipped with internal agitation, external heating means, means for maintaining an inert atmosphere, and means for adding and discharging reactants and products is added 22 parts of triethylborane and 25 parts of water. Then, 15.9 parts of mercuric acetate dissolved in 200 parts of water are added with agitation at room temperature over a period of 15 minutes. At the completion of the addition, the two layers which form are separated by withdrawing the lower layer. The lower layer, diethylmercury, is readily separated in this manner in high yield.

*Example II*

When Example I is repeated with exception that 0.4 part of sodium hydroxide are incorporated into the mixture of triethylborane and water before addition of the mercury acetate, a more complete separation and higher yield of the diethylmercury product is obtained.

*Example III*

When Example I is repeated substituting trioctylborane and maintaining the reaction system at 50° C. during the course of the addition, dioctylmercury is obtained.

*Example IV*

When 38.6 parts of mercuric phenolate are added over a period of 20 minutes to 9.2 parts of trivinylborane in 500 parts of water and containing 1.0 part of potassium hydroxide at room temperature, divinylmercury forms and drops to the bottom of the reactor in high yield.

*Example V*

Di-1-hexenylmercury is obtained in essentially quantitative yield when 29.0 parts of mercuric formate are added to 30.0 parts of tri-1-hexenylborane in 750 parts of water over a period of 30 minutes at room temperature and with continuous agitation.

*Example VI*

When Example I is repeated substituting mercuric naphthenate for mercuric acetate and also incorporating 0.7 part of calcium hydroxide into the mixture, diethylmercury is obtained in high yield.

*Example VII*

In this run, 8.4 parts of trioctadecylborane are reacted with 2.4 parts of mercury octanoate in the presence of 1000 parts of water and 0.5 part of magnesium hydroxide at reflux temperature (100° C.) for 15 minutes after completion of addition of the mercuric salt to the trioctadecylborane. At the completion of the reaction, dioctadecylmercury is withdrawn from the reactor in high yield.

*Example VIII*

When Example VII is repeated substituting mercuric benzoate and tri-1-octadecenylborane for the mercuric salt and organoborane respectively, di-1-octadecenylmercury is obtained in high yield.

*Example IX*

When Example I is repeated substituting mercuric thiofuroate, mercurous ethylate, mercuric linoleate, mercuric thiophenate, and mercuric octanoate for mercuric acetate, high conversion to diethylmercury is obtained.

The above examples are presented by way of illustration and the invention is not intended to be limited thereby. It will be evident that other organoborane compounds described hereinbefore can be substituted to produce similar results.

As indicated, advantage is achieved by incorporating a base in the reaction mixture. The incorporation of such materials in the reaction mixture results in an enhancement in yield and more effective separation of the product. For this purpose, the alkali and alkaline earth hydroxides are quite well suited as, for example, sodium hydroxide, potassium hydroxide, lithium hydroxide, magnesium hydroxide, calcium hydroxide, strontium hydroxide, and the like. The hydroxide need be added only in minor amount to result in a slight basicity of the reaction mixture. Generally, such materials are preferably added in amount between about 0.1 to 3 moles of hydroxide ion per mole of the mercury salt.

The temperature at which the reaction is conducted is subject to considerable latitude, but generally is between about 0° C. to the decomposition temperature of the reactants or products. For practical reasons, the reaction is ordinarily conducted at between about 0 to 100° C. Best results are obtained, however, when the temperature is maintained between 20 to 100° C. There is no need to employ pressure in the operation unless one desires to conduct the reaction at a temperature above the boiling point of the reaction mixture. Reduced pressures can be employed if it is desired to steam distill the product from the reaction mixture as, for example, when it is lower boiling than the organoborane reactant.

The reaction is generally instantaneous so that time is not a critical factor. That is, the reaction is essentially complete upon completion of addition of the mercury salt to the alkyl- or alkenylborane or visa versa. The time of addition can vary from between about 5 minutes to 2 hours or longer, although addition periods of about 30 minutes are usually quite adequate. Because of the instantaneous reactivity and the ready removal of the product from the reaction system, the process is readily adaptable to continuous operation. For example, one such operation would be the co-mingling of the mercury salt with a stream of the trialkyl- or trialkenylborane, water, and hydroxide, if employed, with continuous separation of the organomercury product from the system.

Having thus described the process of this invention, it is not intended that it be limited except as set forth in the following claims:

I claim:

1. The process for the manufacture of an organomercury compound which comprises reacting a mercury salt of an organic acid wherein mercury is attached to carbon through an intermediate atom selected from the group consisting of oxygen and sulfur and wherein said organic acid contains up to about 25 carbon atoms with an organoborane selected from the group consisting of trialkylborane and trialkenylborane in the presence of water.

2. The process of claim 1 wherein said organoborane is a trialkylborane, said mercury salt is a mercuric salt of a lower alkanoic acid, and said reaction is conducted at a temperature between about 20 to 100° C.

3. The process of claim 2 further characterized in that the reaction is conducted in the presence of a hydroxide selected from the group consisting of alkali and alkaline earth metal hydroxides.

4. The process for the manufacture of diethylmercury which comprises reacting mercuric acetate with triethylborane in the presence of water at a temperature between about 20 to 100° C.

5. The process of claim 4 wherein the reaction is conducted in the further presence of a minor amount of sodium hydroxide.

References Cited in the file of this patent

Chemical Reviews, vol. 54, October 1954, pp. 875 to 890.